United States Patent [19]
Goetz et al.

[11] Patent Number: 5,794,566
[45] Date of Patent: Aug. 18, 1998

[54] KITTY LITTER PAN

[75] Inventors: Catherine F. Goetz, Pittsburgh; Dennis L. Klemm, Oakdale, both of Pa.

[73] Assignee: Alco Industries, Inc., Valley Forge, Pa.

[21] Appl. No.: 825,776

[22] Filed: Apr. 2, 1997

Related U.S. Application Data

[60] Provisional application No. 60/014,733 Apr. 2, 1996, and provisional application No. 60/018,992 Jun. 4, 1996.

[51] Int. Cl.⁶ .................................................. A01K 1/035
[52] U.S. Cl. .......................... 119/161; 119/165; 119/170
[58] Field of Search .............................. 119/161, 164, 119/165, 169, 170

[56] References Cited

U.S. PATENT DOCUMENTS

| | | | |
|---|---|---|---|
| 4,926,794 | 5/1990 | Yamamoto | 119/165 |
| 4,949,673 | 8/1990 | Yamamoto | 119/169 |
| 5,058,528 | 10/1991 | Counseller et al. | 119/165 |
| 5,092,270 | 3/1992 | Simons et al. | 119/165 X |
| 5,134,974 | 8/1992 | Houser | 119/165 X |
| 5,220,885 | 6/1993 | Goetz | 119/165 |
| 5,623,892 | 4/1997 | O'Rourke et al. | 119/165 |

*Primary Examiner*—Michael J. Carone
*Assistant Examiner*—Elizabeth Shaw
*Attorney, Agent, or Firm*—Webb Ziesenheim Bruening Logsdon Orkin & Hanson, P.C.

[57] ABSTRACT

A portable, integrated litter pan for a cat or other domesticated animal which comprises a housing of an upper section and lower section detachably secured together to provide a substantially closed container. The sections are stackable and nestable for storage, shipping and/or display. Additionally, at least one of the upper or lower sections includes at least one storage compartment therein for receiving a roll of litter pan liners therein. A bag support rod is provided to rotatably support the roll of litter pan liners. A scoop hook is additionally provided for coupling a litter box scoop to the litter pan of the present invention.

13 Claims, 12 Drawing Sheets

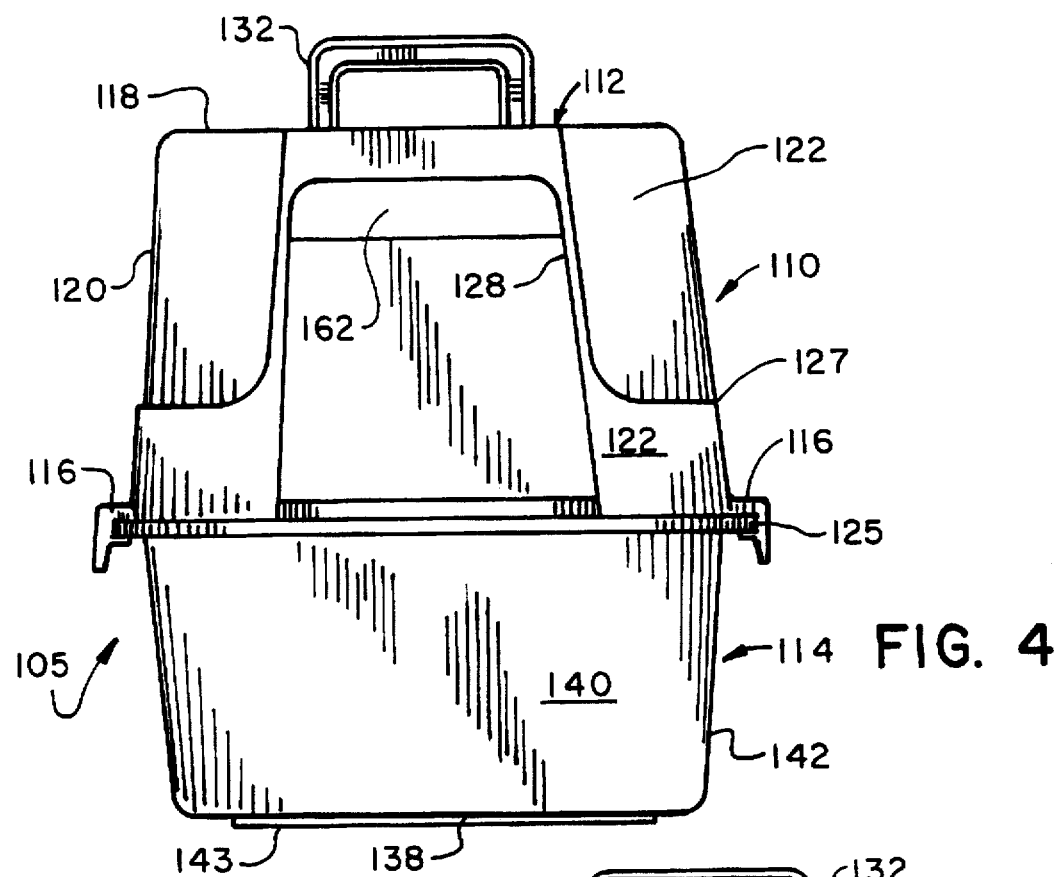
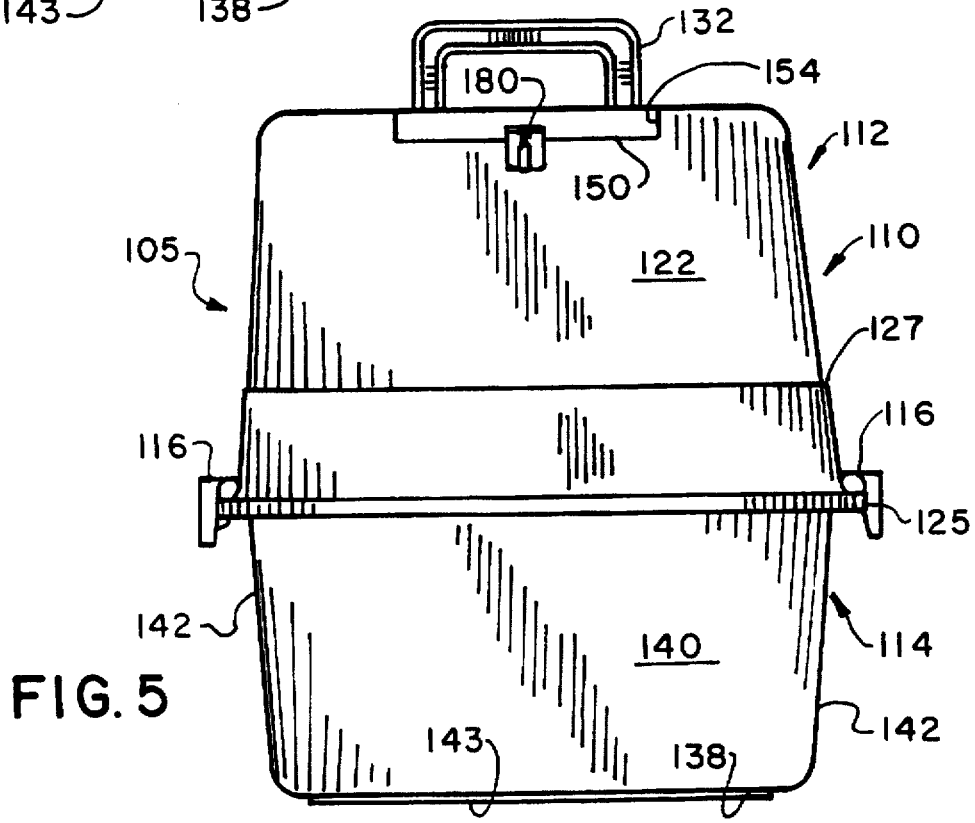

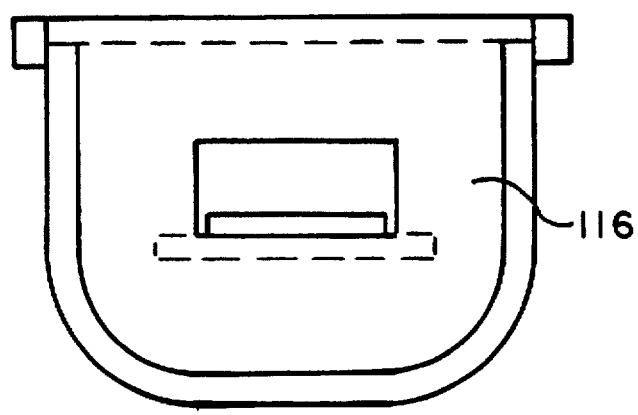
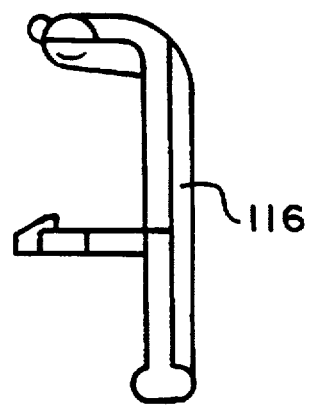
FIG. 9a    FIG. 9b
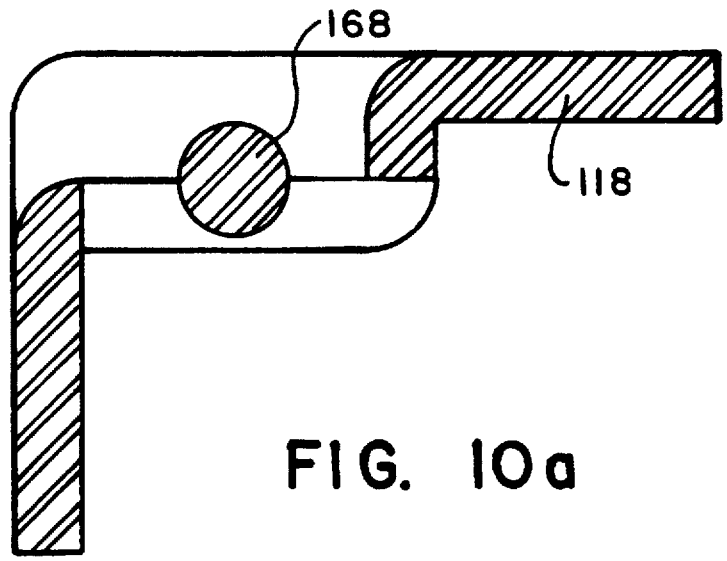
FIG. 10a
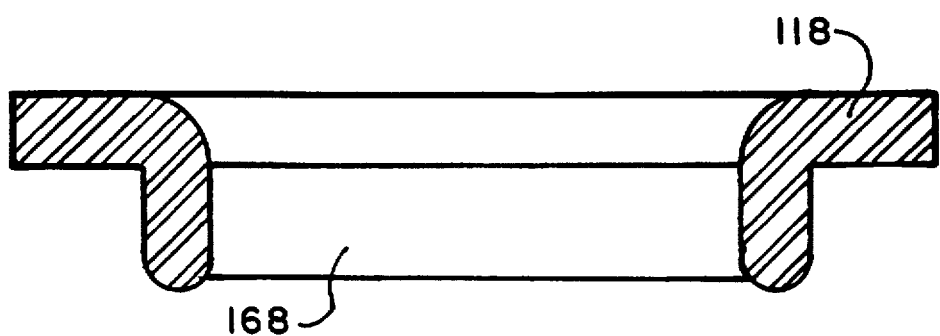
FIG. 10b

KITTY LITTER PAN

This application claims the benefit of U.S. Provisional application Ser. No. 60/014,733, filed Apr. 2, 1996, and U.S. Provisional application Ser. No. 60/018,992, filed Jun. 4, 1996.

BACKGROUND OF THE INVENTION

1. Field of the Invention

The present invention relates to litter pans or litter boxes, particularly portable litter pans for cats or other domesticated small animals.

2. Prior Art

The problem of sanitation and waste collection has been around since the domestication of household animals such as cats. Absorbent litter is widely employed for this purpose. Plastic containers, boxes and pans are generally used to hold the litter since they may be emptied, cleaned and refilled with relative ease. Additionally, covered plastic boxes have become popular, such as described in U.S. Pat. No. 5,220,885 to Goetz, entitled "LITTER BOX". The '885 patent discloses a portable litter box for a cat or other domesticated animal which comprises a housing having upper and lower sections detachably securable to provide a substantially closed container. Each of the sections is stackable for storage, shipping and/or retail display. Additionally, the upper section includes a carrying handle for the box as well as a mechanism for holding an air freshener.

One problem with these prior art portable litter boxes is that they do not accommodate the other accessories associated with a litter box. Such accessories include box liners which are customarily utilized to cover the bottom portion of the litter box or pan and litter pan scoops which are utilized to selectively remove waste from the absorbent litter. The storage of these separate accessories in remote locations is generally inconvenient for the user. An object of the present invention is to overcome the drawbacks of the prior art.

SUMMARY OF THE INVENTION

We have invented a portable kitty litter pan for a cat or other domesticated animal which includes a housing having an upper and a lower section, with the upper section including a compartment adapted to hold a supply of pan liners therein. The kitty litter pan of the present invention additionally incorporates a scoop support attached to the housing for coupling a litter box scoop to the litter pan of the present invention.

The kitty litter pan of the present invention may include a housing having upper and lower sections detachably securable to provide a substantially closed container. These sections are preferably stackable for storage, shipping and/or retail display with the upper section including a carrying handle for the litter pan as well as a mechanism for holding an air freshener. The lower section may further include skid resistant feet. Pivotable clips may be utilized for releasably attaching the upper section to the lower section.

In one embodiment of the present invention, the pan liner storage compartment may be formed in an upper section of the litter pan with a hinged, closable top covering the compartment. The bottom of the compartment may have an arcuate bottom formed to fit a roll of litter pan liners therein. Additionally, the present invention may further include a support rod extending through the bag of liners for rotatably supporting the roll of litter pan liners within the compartment.

The scoop support for attaching the litter box scoop to the litter pan of the present invention may include a hook attached to the litter pan.

These and other advantages of the present invention will be clarified in the following description of the presently preferred embodiment of the present invention, together with the attached drawings, wherein like reference numerals represent like elements throughout.

BRIEF DESCRIPTION OF THE DRAWINGS

FIG. 4 is a front view of the integrated kitty litter pan illustrated in FIG. 1;

FIG. 5 is a back view of the integrated kitty litter pan illustrated in FIG. 1;

FIGS. 9a and 9b show an enlarged front view and side view, respectively, of a clip used for coupling the upper section of the kitty litter pan to the lower section thereof, as shown in FIG. 1;

FIGS. 10a and 10b are enlarged sections of a hinge construction for a container cover of the integrated kitty litter pan illustrated in FIG. 1;

DESCRIPTION OF THE PREFERRED EMBODIMENT

As shown in FIGS. 1–14, a portable kitty litter pan 105 (or litter box) for a cat or other domesticated animal comprises a housing having an upper section 112 and a lower section 114, as shown in FIGS. 2–5. The two sections are adapted to be detachably secured together by a plurality of pivotable clips 116 to provide a substantially closed container in the assembled condition. Clips 116 are shown in detail in FIGS. 9a and 9b.

Figure 7:
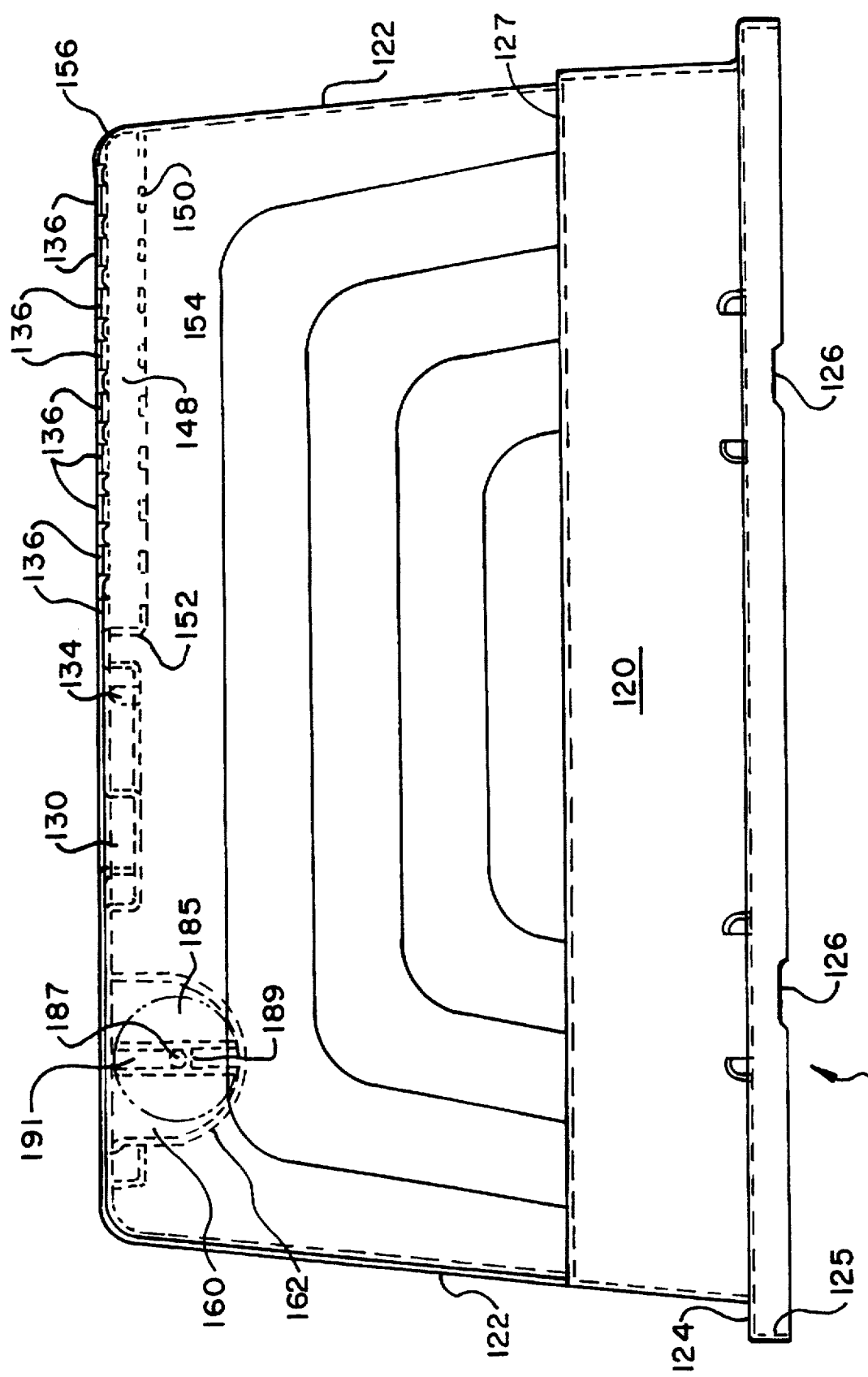
FIG. 7 is an enlarged, sectional side view of the upper portion of the integrated kitty litter pan illustrated in FIG. 1.
Figure 8:
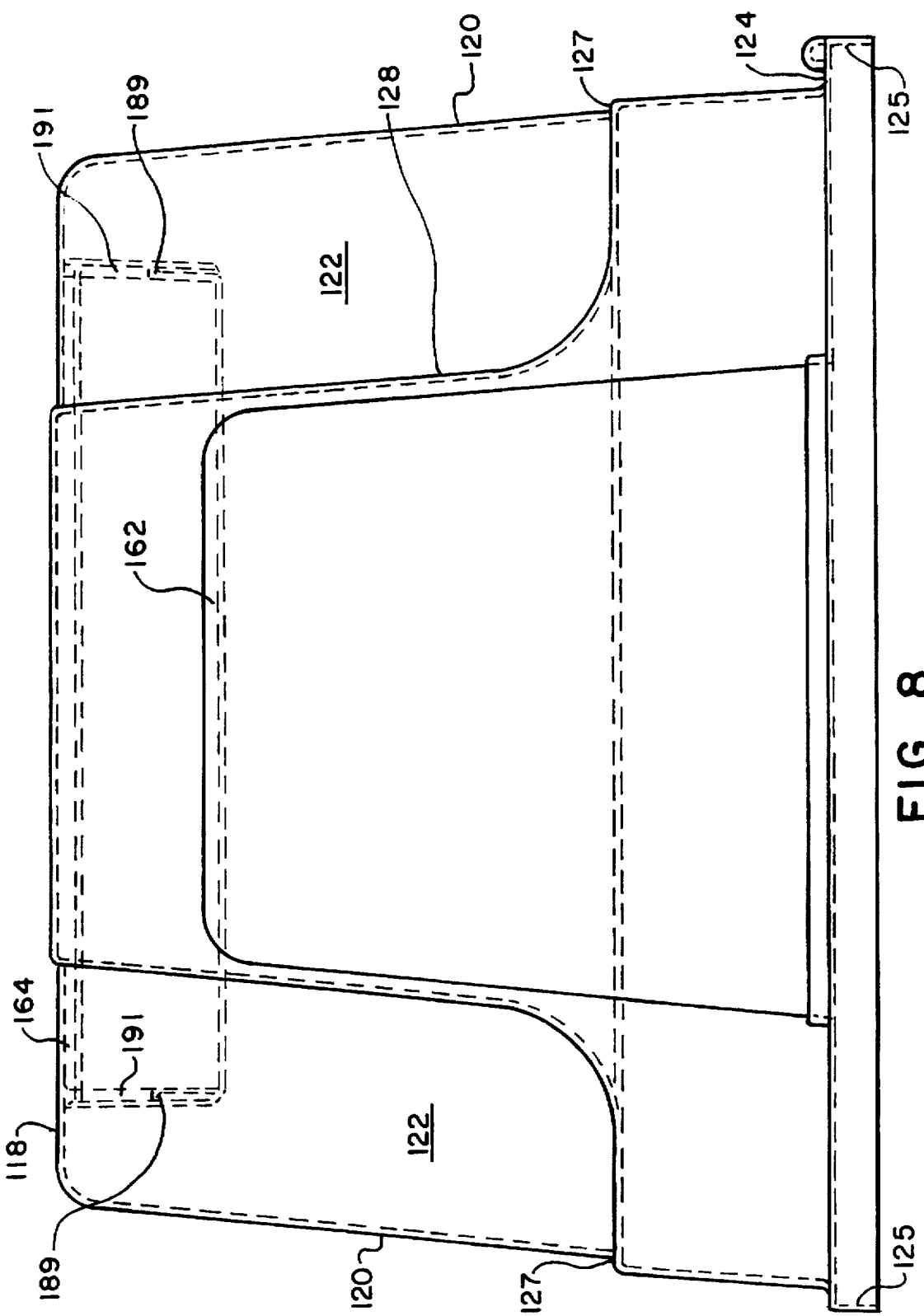
FIG. 8 is a front view of the upper portion illustrated in FIG. 7.
Figure 11:
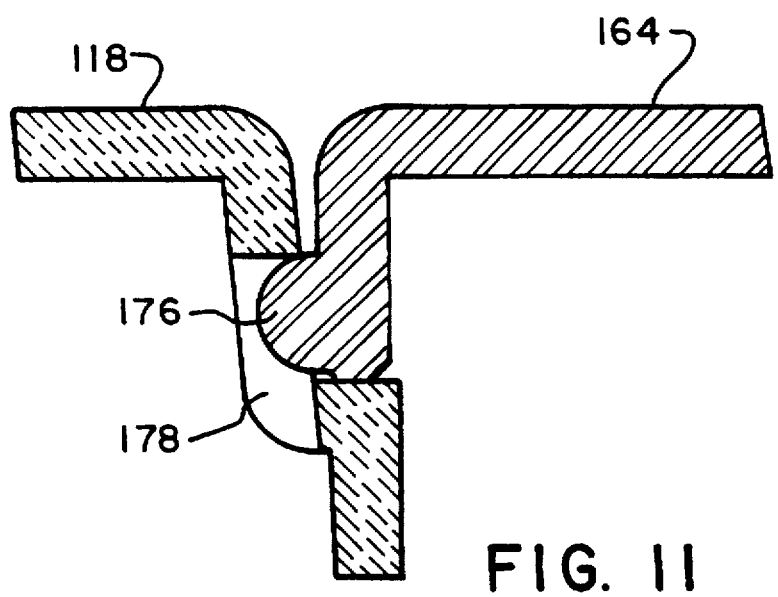
FIG. 11 is an enlarged section of a snap section for the container cover of the integrated kitty litter pan illustrated in FIG. 1.
Figure 12A:
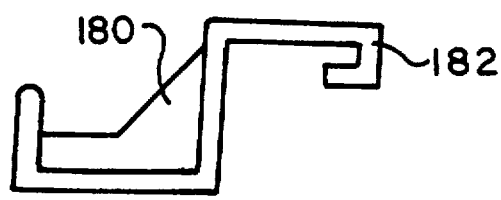
FIGS. 12a, 12b and 12c are an enlarged side view, top view and bottom view of a scoop hook of the integrated kitty litter pan illustrated in FIG. 1.
Figure 12B:
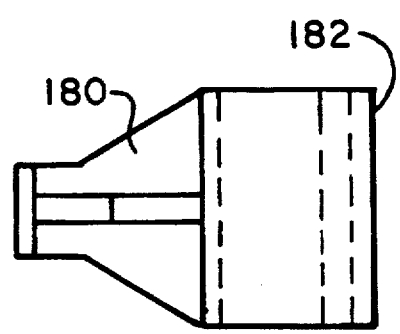
Figure 12C:
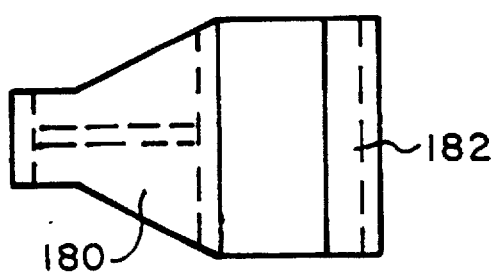

The upper section 112, shown in detail in FIGS. 7 and 8, includes a substantially planar top 118, a pair of depending outwardly flaring sidewalls 120 and a pair of depending outwardly flared end walls 122. Flange 124 of a lip 125 extends continuously around the perimeter of the section at edges of the depending walls and in a plane substantially parallel but spaced from the plane of the top wall 118. A plurality of cutouts 126 is provided in the lip 125 for receiving a coupling portion of clip 116.

An opening 128 is formed in an end wall 122 to allow for ingress and egress by a cat, or the like, into the interior of the pan 105. A shoulder 127 circumvents the upper section 112 on the sidewalls 120 and end wall 122 opposite the end wall having an opening 128. The shoulder 127 is substantially parallel with the flange 124 and spaced therefrom.

Figure 1:
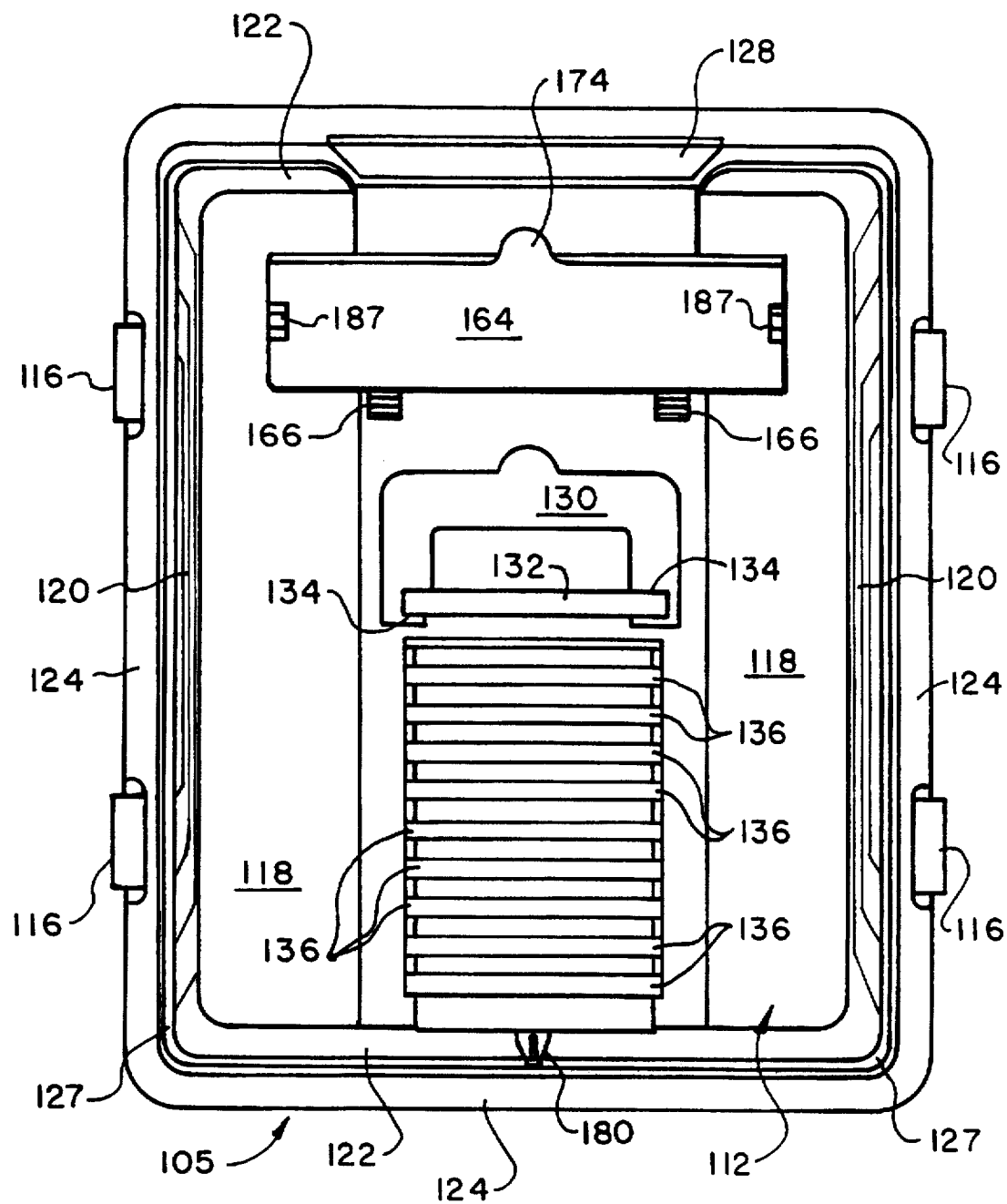
FIG. 1 is a top view of an integrated kitty litter pan according to the present invention.
Figure 2:
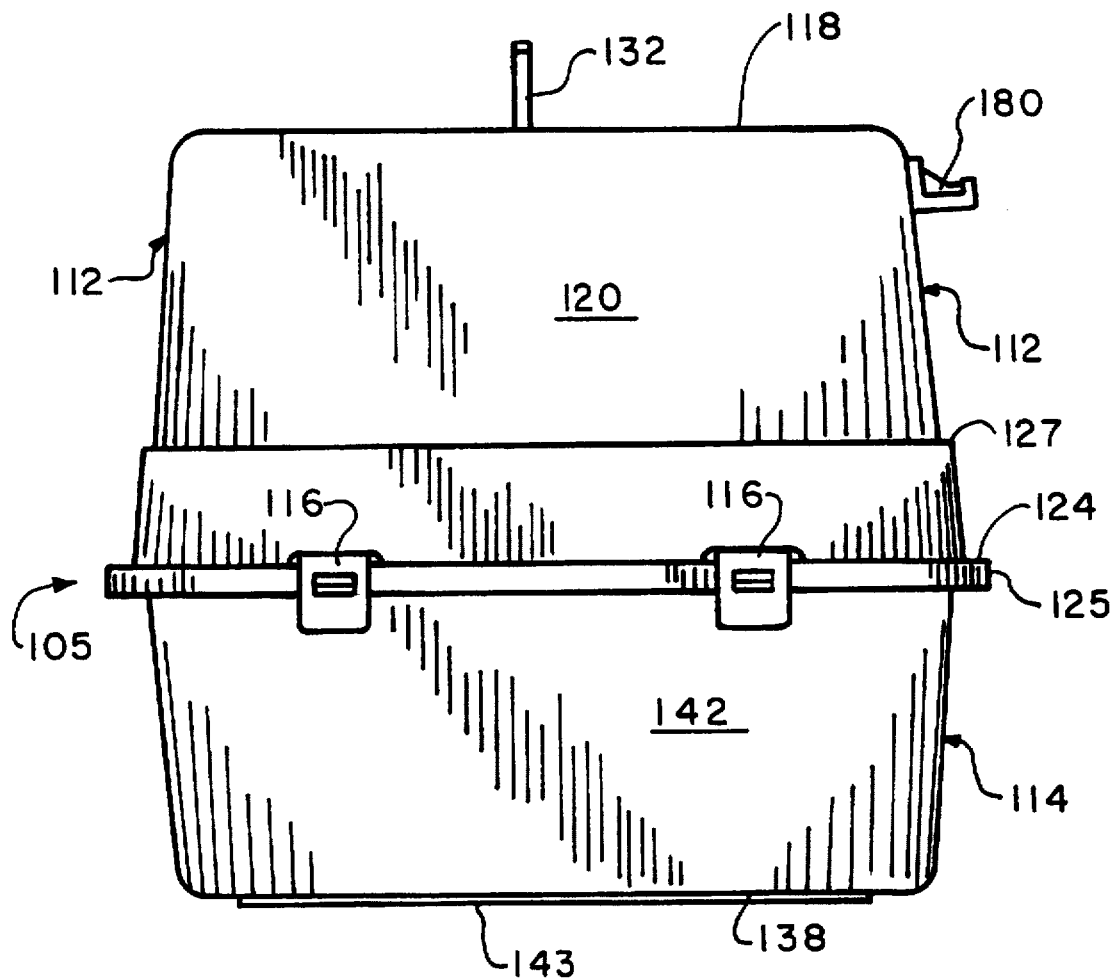
FIG. 2 is a side view of the integrated kitty litter pan illustrated in FIG. 1.

A U-shaped handle receiving recess 130 is provided in the planar top wall 118 of the pan 105. A handle 132 for carrying the assembled litter pan 105 is pivotably mounted in ends 134 of the recess 130, as shown in FIG. 1.

A plurality of openings in the form of elongated slots 136 is also provided in the top wall 118. The slots 136 provide ventilation from the exterior to the interior of the pan 105.

The lower section 114, shown in FIGS. 2–6, of the housing comprises a bottom wall 138 which is substantially planar. End walls 140 extend upwardly and outwardly from the perimeter of the bottom wall 138. Similarly, a pair of sidewalls 142 extends upwardly and outwardly from the bottom wall 138. A plurality of feet and ribs 143 may be provided on the outside of the bottom wall 138 as shown. Furthermore, additional non-skid feet made of natural synthetic rubber material may be attached to the bottom wall 138, as discussed in U.S. Pat. No. 5,220,885, which is incorporated herein by reference.

The upper edges of walls 140 and 142 extend outwardly and then downwardly, continuously forming a lip 144 which is adapted to mate in a complementary relationship with the flange 124 and lip 125 of the upper section 112, as shown in FIGS. 4 and 5, when the sections are assembled.

Figure 3:
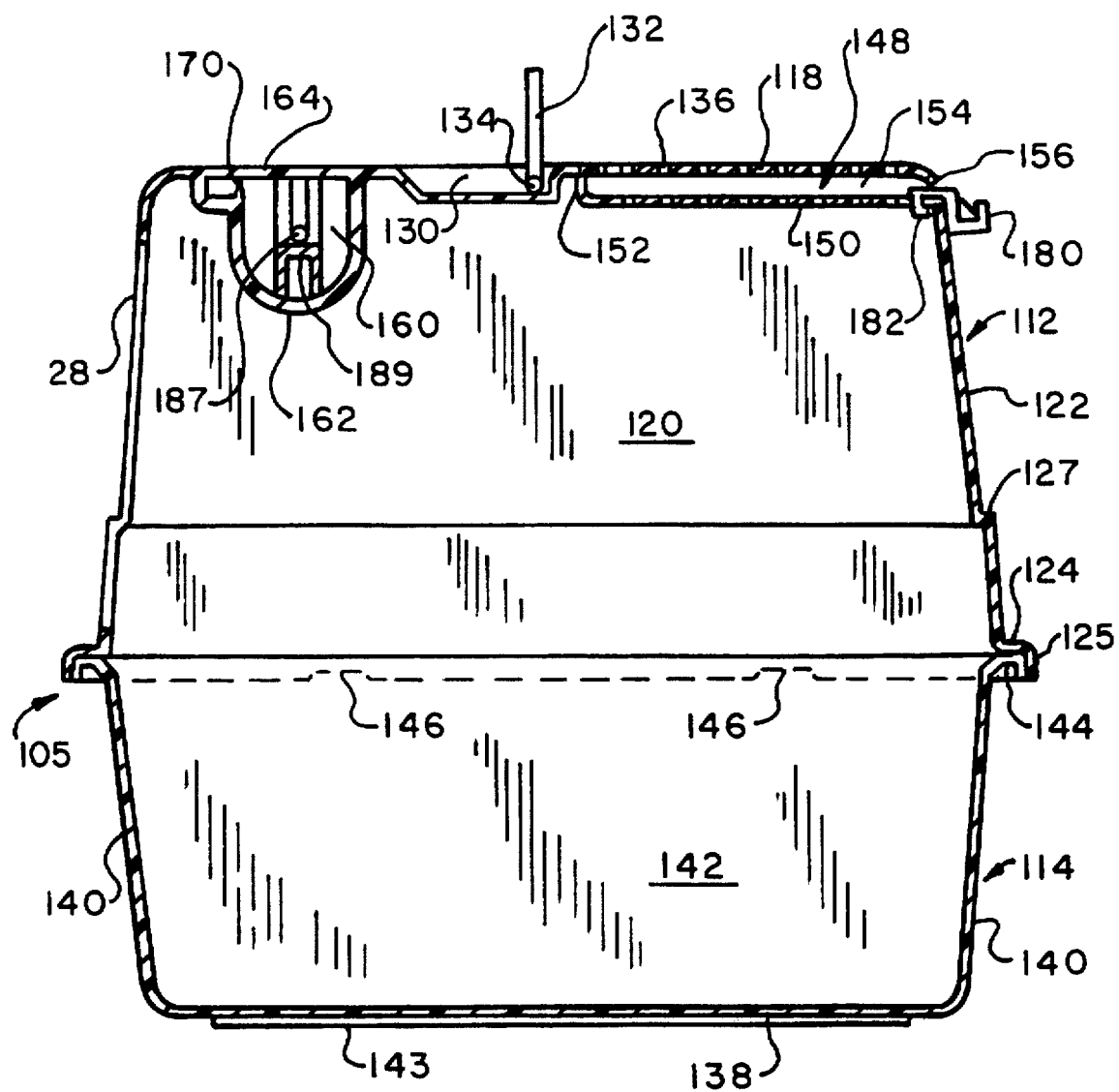
FIG. 3 is a sectional side view of the integrated kitty litter pan illustrated in FIG. 1.
Figure 6:
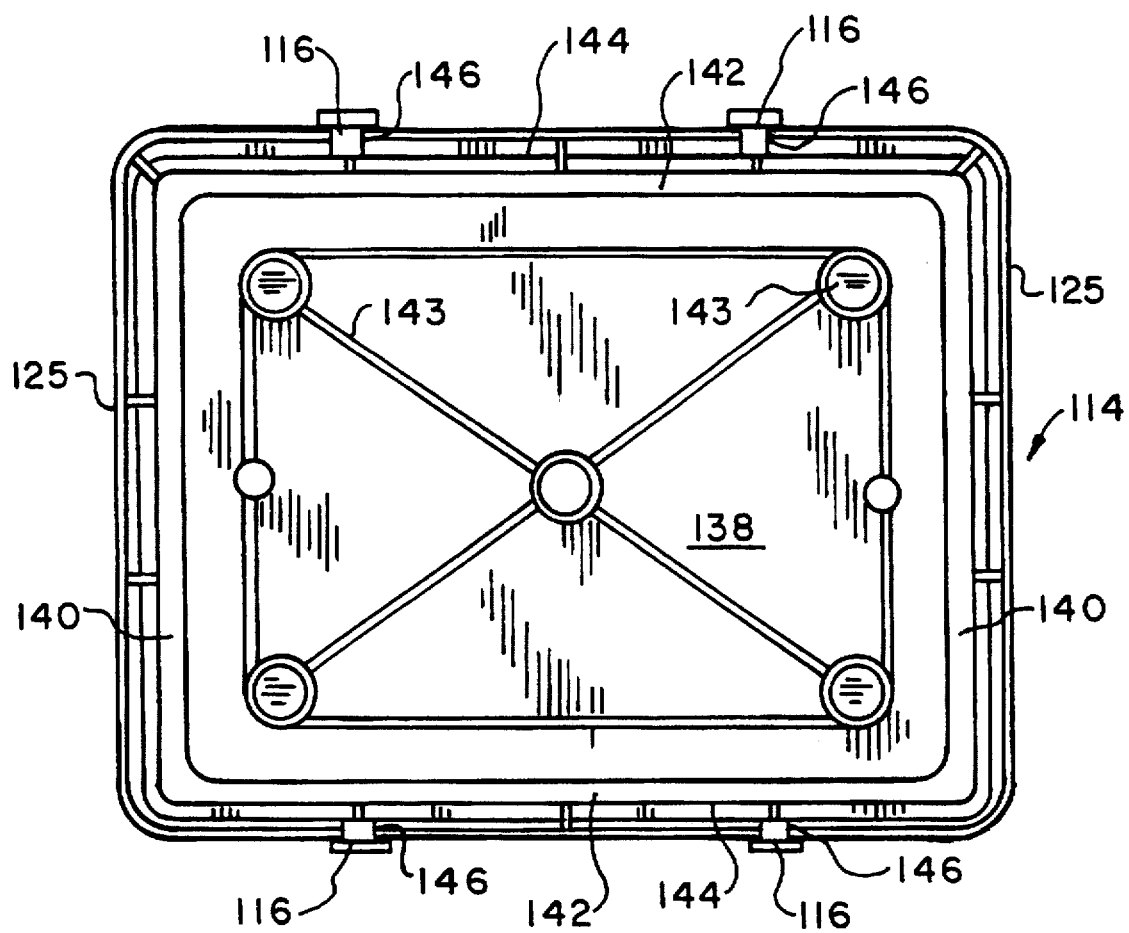
FIG. 6 is a bottom view of the integrated kitty litter pan illustrated in FIG. 1.

A plurality of cutouts 146, shown in phantom in FIG. 3, is provided in the lower lip 144 adapted to receive the coupling portion of the hinge 116. The cutouts 126 and 146 are in registration when the upper section 112 is positioned on the lower section 114, as shown in FIGS. 2–5.

As shown in FIGS. 3 and 7, an elongated compartment 148 having a bottom wall 150, rear wall 152 and sidewalls 154 is provided in the upper section 112 for holding a freshener (not shown). Such fresheners are currently available commercially in the form of disposable packages. The freshener is inserted in the compartment 148 from the exterior of the pan 105, or litter box, through an opening 156 in end wall 122 and removed, after use, through the same opening 156.

Figure 13A:
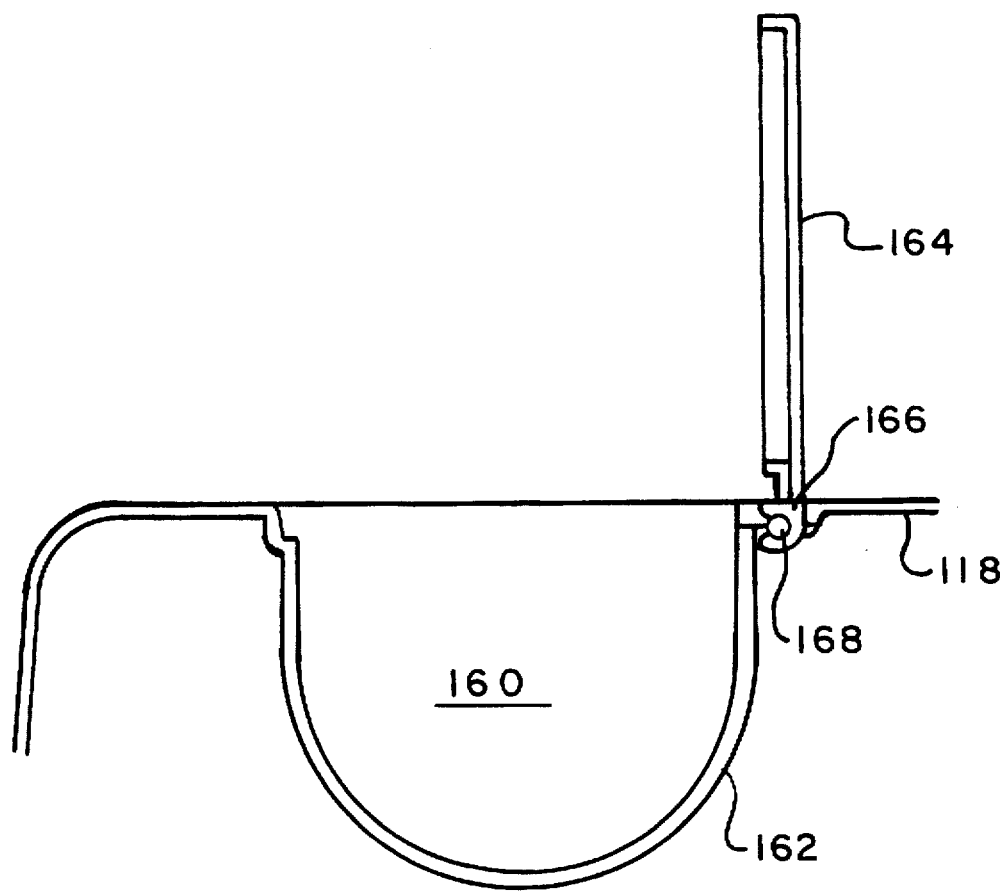
FIGS. 13a and 13b schematically illustrate the operative open and closed positions of the container cover of the integrated kitty litter pan illustrated in FIG. 1.
Figure 13B:
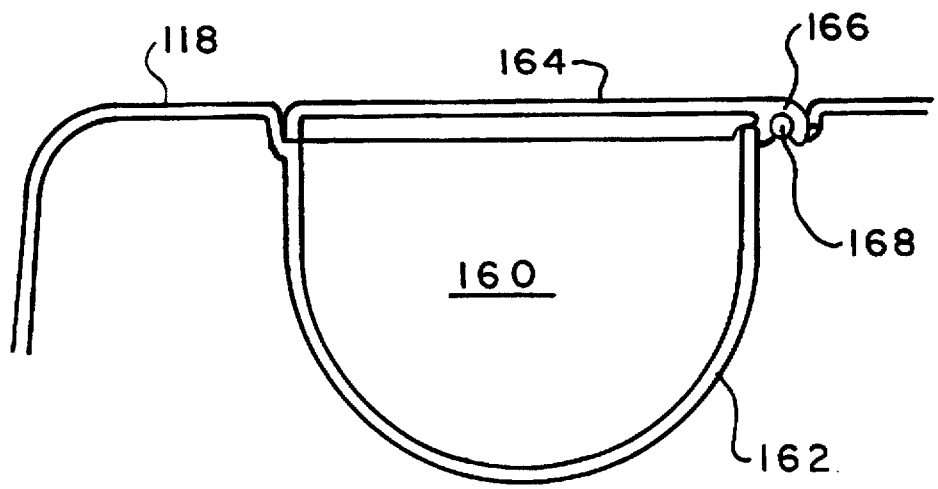

A significant feature of the present invention is that the upper section 112 includes a compartment 160 formed in the top wall 118 of the pan 105. The compartment includes an arcuate bottom wall 162 conforming to the shape of a roll of litter pan liners 185, schematically shown in FIG. 14. Litter pan liners are commercially available and are adapted to be positioned around the interior of the lower portion 114 to hold the absorbent litter material therein. The litter pan liners allow for easy replacement and cleaning of the pan 105. As shown in FIGS. 1, 13a and 13b, a pivotable cover 164 overlays the compartment 160 to cover the compartment 160 in the closed position and allow access to the compartment 160 in the open position. The cover 164 includes hinges 166 received in hinge receivers 168 in the top wall 118 shown in detail in FIGS. 10a and 10b. The cover 164 rests on a ledge 170 formed around the compartment 160 as shown in detail in FIGS. 10a and 10b. The cover 164 includes an opening tab 174 at a forward portion thereof to help opening of the cover 164. The cover 164 additionally includes a locking snap 176 received within a locking opening 178 to hold the pivotal cover 164 in the closed position shown in detail in FIG. 11.

Figure 14:
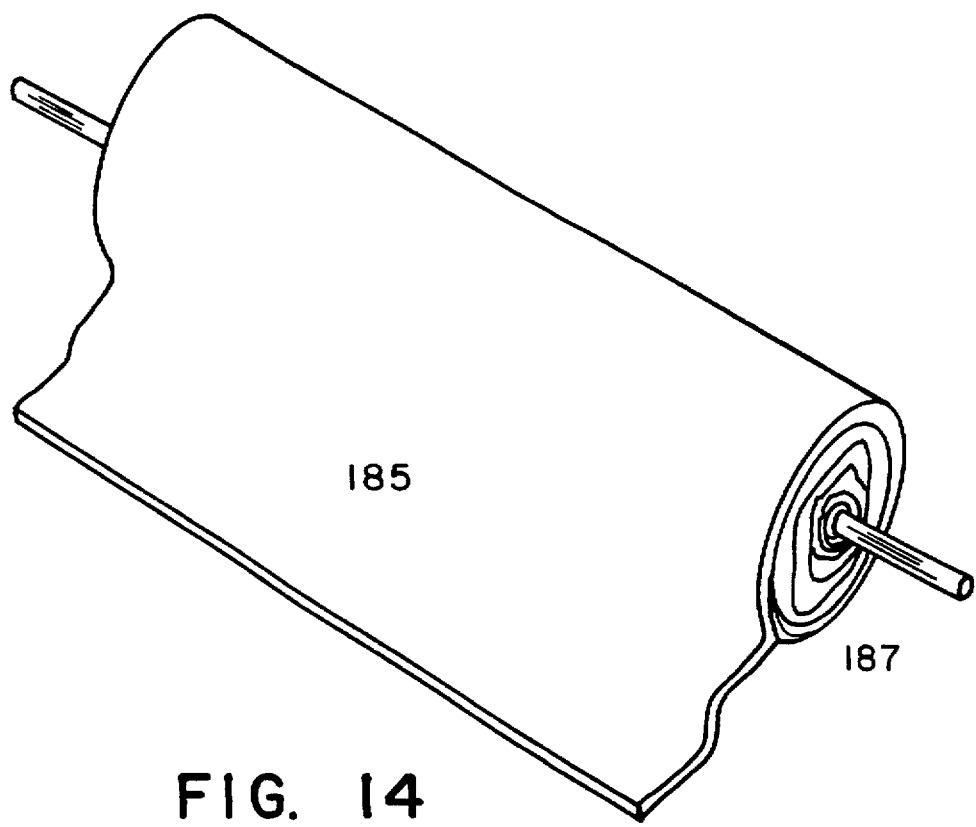
FIG. 14 schematically illustrates a roll of litter pan liners supported on a spring biased axle for rotatable mounting in the integrated kitty litter pan of FIG. 1.

The arcuate bottom 162 helps hold the roll of litter pan liners 185 in an easily rotatable manner. A separate support rod 187 is inserted through the roll of litter pan liners 185, as shown in FIG. 14, with the ends of the support rod 187 supported on stop 189 within channel 191 formed in the sides of the compartment 160 to rotatably position the roll of litter pan liners 185 within the compartment 160. These features allow for the easy rotation of the roll of litter pan liners 185 and to provide easy access thereto.

A further important feature of the present invention is the provision of a scoop hook 180 on the back of the upper section 112. The hook 180 is shown in detail in FIGS. 12a, 12b and 12c. The scoop hook 180 preferably includes a U-shaped clip 182 to attach the scoop hook 180 to the bottom wall 150 of the compartment 148 as shown in FIG. 3. The scoop hook 180 provides a mechanism for coupling a litter box scoop to the pan 105 of the present invention. A conventional litter box scoop includes a hole in the elongated handle which can engage hook 180.

Figure 15:
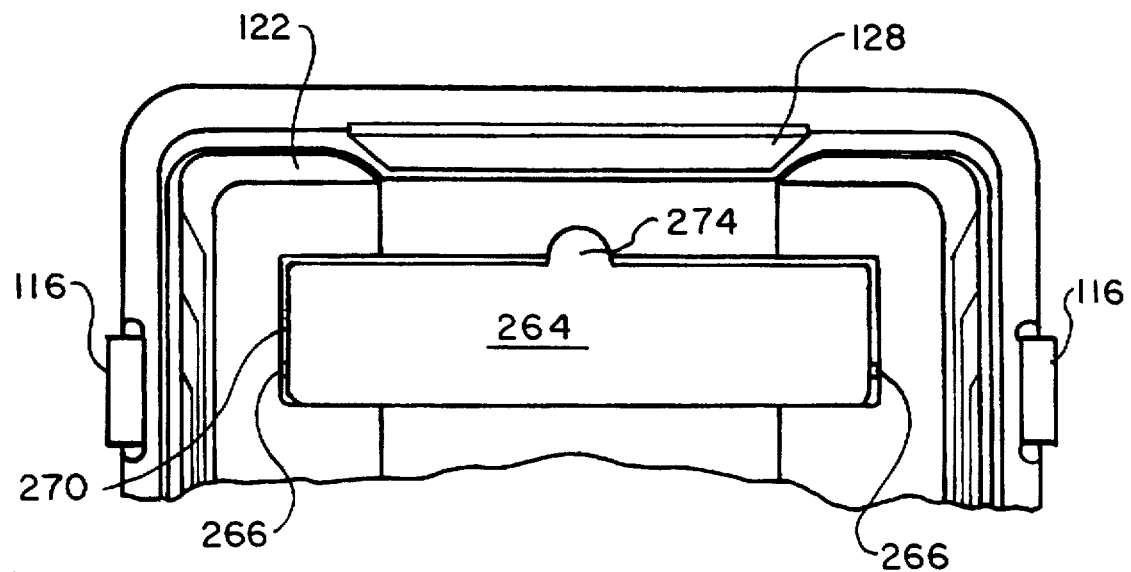
FIG. 15 is a top view of a portion of a modified kitty litter pan according to the present invention.
Figure 16A:
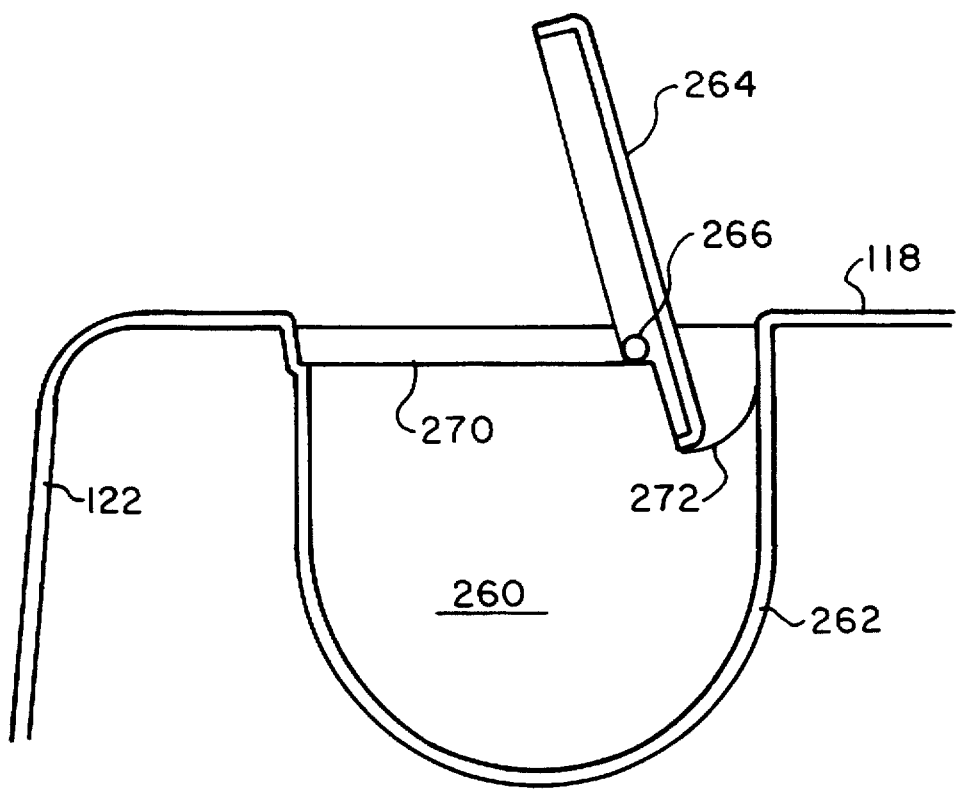
FIGS. 16a and 16b schematically illustrate the operative open and closed position of the modified kitty litter pan illustrated in FIG. 15.
Figure 16B:
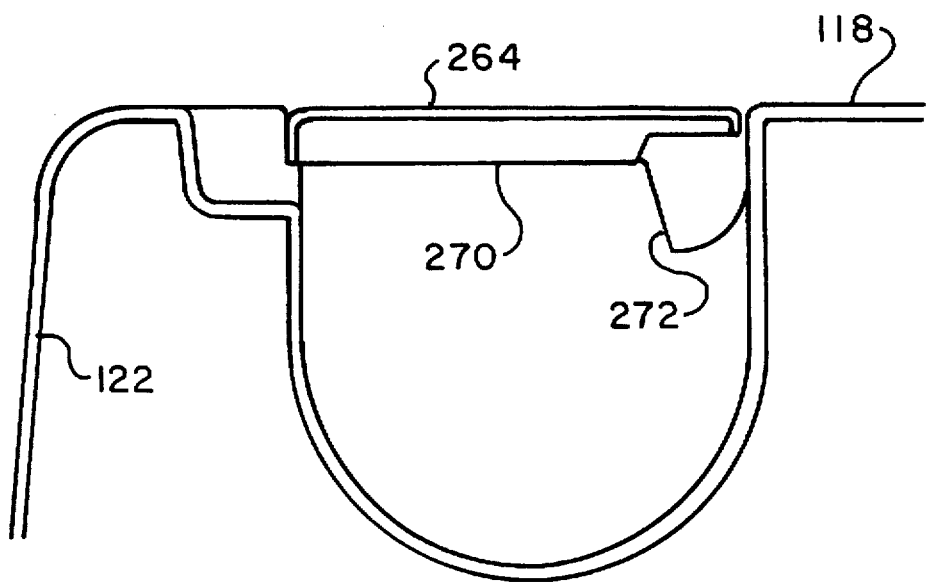

FIG. 15 illustrates a kitty litter pan 105 according to a modified embodiment of the present invention. The kitty litter pan 105 of FIG. 15 is substantially the same as the kitty litter pan 105 shown in FIGS. 1–14 except for a modified compartment 260 and pivotable cover 264. The compartment 260 includes an arcuate bottom wall 262 which conforms to the shape of the roll of litter pan liners 185. As shown in FIGS. 16a and 16b, the pivotable cover 264 overlays the compartment 260 to cover the compartment 260 in the closed position and allow access to the compartment 260 in the open position. The cover 264 includes hinge pins 266 received in hinge pin holes in the sidewalls of the compartment 260. The cover 264 rests on a ledge 270 formed around the compartment 260. The ledge 270 includes a drop-out 272 to accommodate the upward pivoting of the cover 264 about the hinge pins 266 to the open position. The cover 264 includes an opening tab 274 at a forward position thereof to help opening of the cover 264. The compartment 260 operates the same as compartment 160 discussed above.

The present invention provides all of the advantages of the prior art litter boxes and maintains the upper and lower sections 112 and 114 in a configuration which can easily be stacked or stored, shipped and/or displayed.

The present invention further provides a litter pan 105 which integrates the various litter box accessories into a single integrated unit, eliminating the need for separate, remote storage of these components. The compartment 160, 260 and scoop hook 180 allow the litter pan liners and litter box scoop, respectively, to be coupled to and stored with the pan 105, providing a completely integrated structure.

Further modifications may be made to the present invention such as incorporating additional compartments adapted to store further accessories of the litter pan, such as for example, a compartment for receiving additional fresheners. The requirements for additional compartments must be similar to the requirements of compartment 160, 260 in that further compartments do not eliminate the present advantages of the present invention. Further compartments should not alter the stacking ability of the upper and lower sections or significantly reduce the space within the interior of the assembled pan or box.

Although the present invention is described in detail above, it will be apparent to those of ordinary skill in the art that various modifications may be made to the present invention without departing from the spirit and scope thereof. The scope of the present invention is defined by the appended claims and equivalents thereto.

We claim:

1. A portable, integrated litter pan including a housing having upper and lower sections detachably securable together to provide a substantially closed container, said upper section containing a pan liner storage compartment formed therein, further including a pivotable top on said upper section covering said liner storage compartment.

2. The litter pan of claim 1 wherein a bottom of said liner storage compartment is arcuate in cross section conforming to a roll of litter pan liners contained therein.

3. The litter pan of claim 2 further including a support rod within said liner storage compartment, said support rod receivable through a roll of liners for rotatably supporting the roll of litter pan liners within said liner storage compartment.

4. A portable, integrated litter pan including a housing having upper and lower sections detachably securable together to provide a substantially closeable container, said upper section containing a pan liner storage compartment formed therein, further including a scoop support attached to said housing, said scoop support adapted to releasably support a litter scoop and wherein said scoop support includes a hook attached to said upper section.

5. The litter pan of claim 4 further including a pivotable top on said upper section covering said liner storage compartment.

6. The litter pan of claim 5 wherein a bottom of said liner storage compartment is arcuate in cross section conforming to a roll of litter pan liners contained therein.

7. The litter pan of claim 6 further including a support rod within said liner storage compartment, said support rod receivable through a roll of liners for rotatably supporting the roll of litter pan liners within said liner storage compartment.

8. The litter pan of claim 7 wherein said pan liner storage compartment further includes a channel formed in the sides of said compartment with a stop formed in said channel, said channels adapted to receive one end of said support rod therein with said support rod abutting against said stop.

9. The litter pan liner of claim 7 wherein said cover further includes a locking snap receivable within a locking opening of said housing adapted to hold said pivotal cover in a closed position.

10. The litter pan liner of claim 7 wherein said upper and lower sections are stackable.

11. The litter pan liner of claim 7 wherein said upper section includes a carrying handle and a means for holding an air freshener.

12. The litter pan liner of claim 7 wherein said lower section further includes a plurality of skid resistant feet.

13. The litter pan liner of claim 7 further including pivotable clips for releasably attaching said upper section to said lower section.

* * * * *

UNITED STATES PATENT AND TRADEMARK OFFICE
CERTIFICATE OF CORRECTION

PATENT NO. : 5,794,566
DATED      : August 18, 1998
INVENTOR(S): Catherine F. Goetz It is certified that error appears in the above-identified patent and that said Letters Patent is hereby corrected as shown below:

Column 2 Line 52 "position" should read --positions--.

Claim 10 Column 6 Line 20 after "litter pan" delete --liner--.

Claim 11 Column 6 Line 22 after "litter pan" delete --liner--.

Claim 12 Column 6 Line 25 after "litter pan" delete --liner--.

Claim 13 Column 6 Line 27 after "litter pan" delete --liner--.

Signed and Sealed this

Twenty-sixth Day of January, 1999

Attest:

*Attesting Officer*     *Acting Commissioner of Patents and Trademarks*